(12) United States Patent
Hiramoto et al.

(10) Patent No.: US 6,354,073 B1
(45) Date of Patent: Mar. 12, 2002

(54) COMBINED CYCLE ELECTRIC POWER PLANT

(75) Inventors: Koji Hiramoto; Yasushi Fukuizumi, both of Takasago (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 0 days.

(21) Appl. No.: 09/381,614
(22) PCT Filed: Jan. 23, 1998
(86) PCT No.: PCT/JP98/00261
§ 371 Date: Dec. 15, 1999
§ 102(e) Date: Dec. 15, 1999
(87) PCT Pub. No.: WO99/37901
PCT Pub. Date: Jul. 29, 1999

(51) Int. Cl.[7] ................................................. F02C 6/00
(52) U.S. Cl. .................................. 60/39.182; 60/39.75
(58) Field of Search ........................... 60/39.182, 39.75

(56) References Cited

U.S. PATENT DOCUMENTS 5,802,841 A * 9/1998 Maeda ...................... 60/39.37
6,105,362 A * 8/2000 Ohtoma et al. .......... 60/39.182
6,116,018 A * 9/2000 Tanimura et al. ............ 60/39.3

* cited by examiner

Primary Examiner—Charles G. Freay
(74) Attorney, Agent, or Firm—Oblon, Spivak, McClelland, Maier & Neustadt, P.C.

(57) ABSTRACT

A combined cycle power plant providing a means to stop the steam entrance of a steam cooling system that cools by stream the high temperature cooled parts of a gas turbine immediately after it is stopped, a means for discharging residual steam to the atmosphere, and a means for supplying dry air, and wherein the element parts of the steam cooling system necessary for purging the residual steam by the means that closes the steam entrance of the steam cooling system are partitioned, the passage by which the residual steam is purged is ensured by the means that discharges the residual gas to the atmosphere, and the purging of the object residual steam is completed by. supplying dry air to the element parts of the partitioned steam cooling system.

4 Claims, 3 Drawing Sheets

PRIOR ART FIG. 2
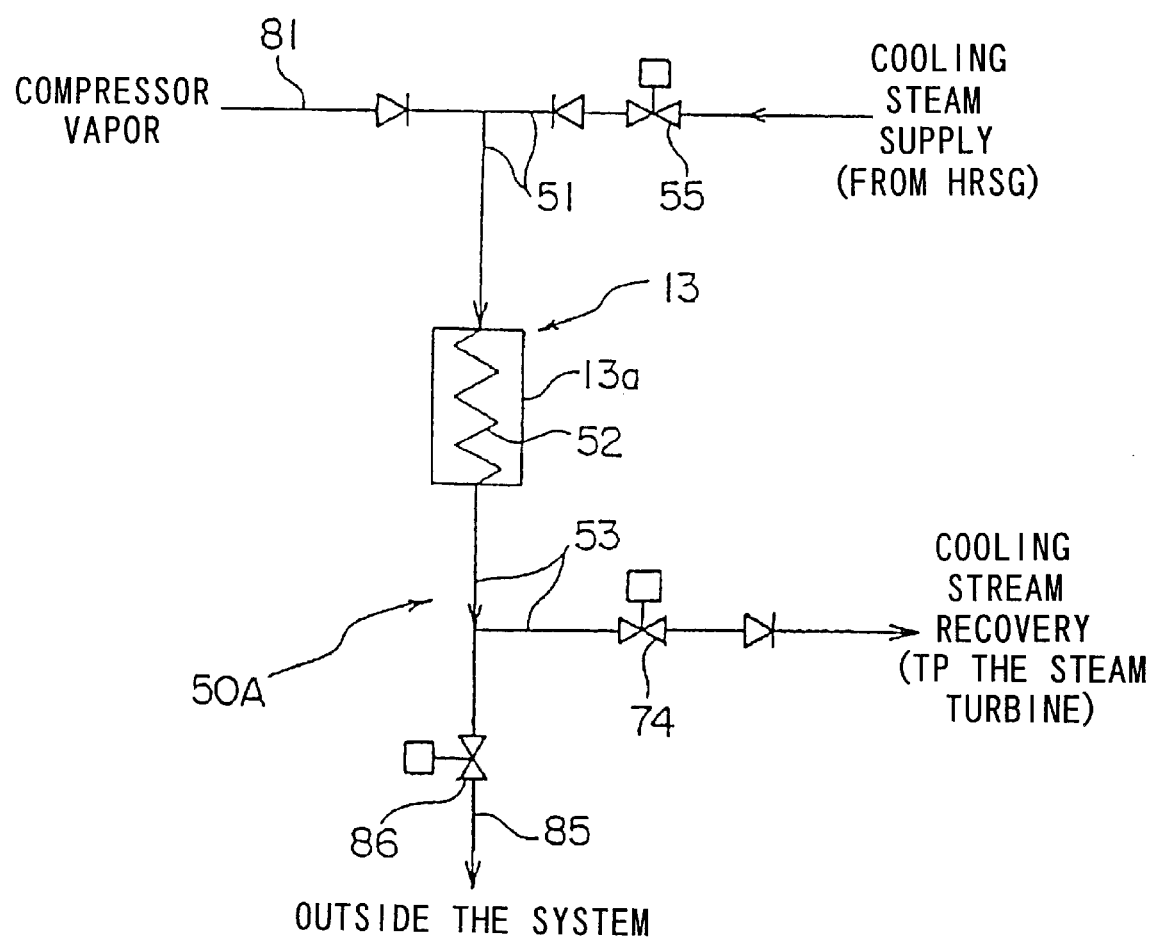

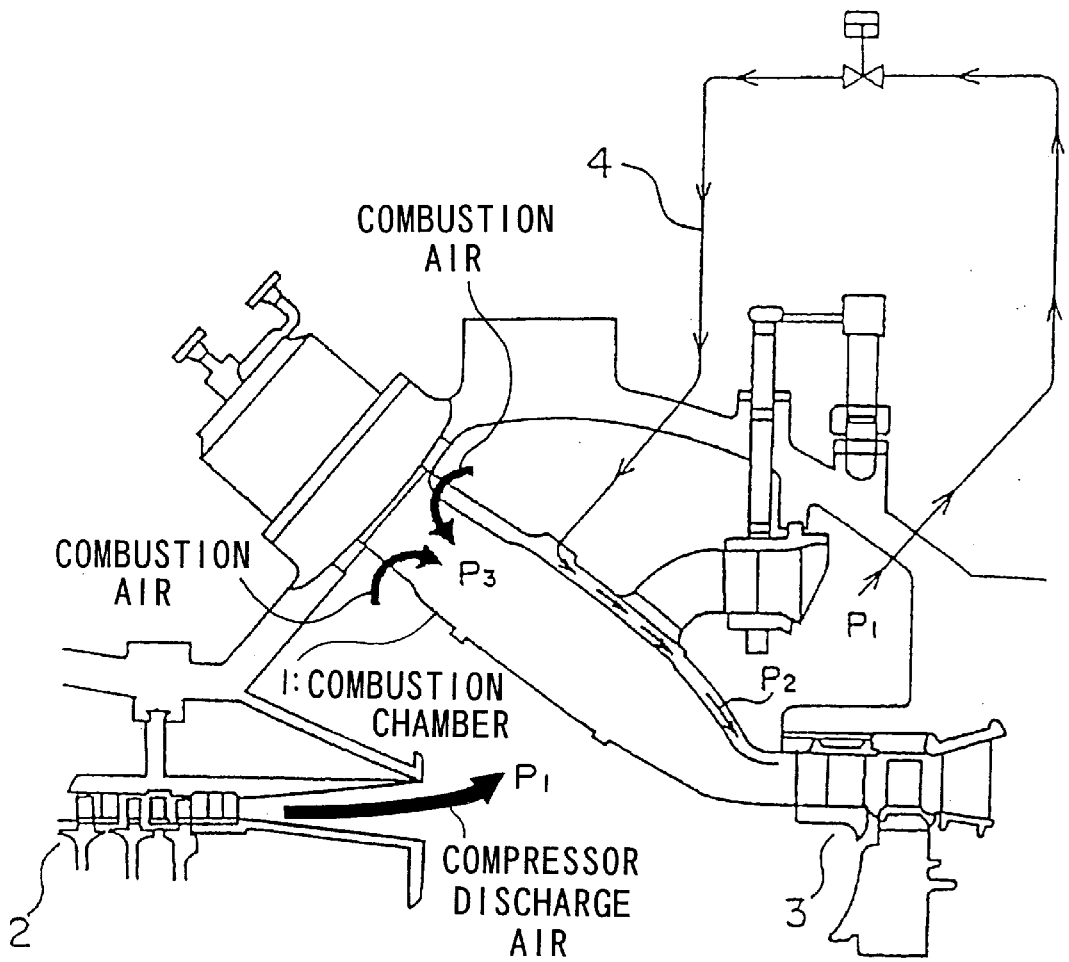
PRIOR ART FIG. 3

COMBINED CYCLE ELECTRIC POWER PLANT

CROSS-REFERENCE TO RELATED APPLICATIONS

This application was filed under 35 U.S.C. § 371 from international application no. PCT/JP98/00261 filed on Jan. 23, 1998, the entire contents of which are incorporated by reference herein.

BACKGROUND OF THE INVENTION

1. Field of the Invention

The present invention relates to a combined cycle power plant that combines a gas turbine plant and a steam turbine plant.

2. Description of the Related Art

A combined cycle power plant is a power generation system that combines a gas turbine plant and a steam turbine plant, and heat energy in the high temperature region is allotted to the gas turbine and heat energy in the low temperature region is allotted to the steam turbine. Heat energy is efficiently recovered and used, and recently, in particular, this power generation system has received much attention.

In this combined cycle power plant, research and development is advancing concerning the one point related to increasing efficiency, that is, how high the high temperature region of the gas turbine can be raised.

In contrast, in the formation of the high temperature region, it is necessary to provide a cooling system to maintain the heat resistance of the turbine structure body, and conventionally air has been used as the cooling medium in this cooling system.

However, to the extent that air is used as the cooling medium, for example, even when the high temperature region can be attained, when considering both the power loss necessary for increasing the air used in cooling to the necessary pressure by the air compressor and the result that the energy of the gas decreases because of the decreasing of the average gas temperature due to the final mixing of air used in the cooling of parts inside the turbine flow passage transited by the high temperature gas, an increase over the present heat efficiencies cannot be expected at this point in time.

In order to solve this problem and implement an increase in efficiency, switching the above a cooling medium in the gas turbine from gas to steam has been proposed.

One example of this is Japanese Unexamined Patent Application, First Publication, No. Hei 05-163960. However, although the invention disclosed in this publication discloses the notion of using steam as a cooling medium in a gas turbine, there remain many problems in the details that must be thought about and solved.

For example, while the gas turbine is stopped, the steam that remains in the steam cooling system must be purged, and in the Japanese Unexamined Patent Application, First Publication, No. Hei 05-163960, a gas turbine is structured as shown in FIG. 2 for this purpose.

That is, while the gas turbine 13 is stopped, immediately before stopping, a supply steam stop valve 55 and a recovery steam stop valve 74 are closed, and the supply of cooling-steam from the cooling steam supply system 51 and the recovery of cooled steam via the steam recovery system 53 is cut off.

On the other hand, by opening the exhaust valve 86, and connecting the steam supply system 52 of the turbine high temperature cooled part 13a to the outside of the system via the drain exhaust system 85, the cooling of the turbine 13 is switched to air cooling by the compressor bleeding via the air supply line 81, and at the same time, the residual steam in the cooling steam supply system 51 and the steam supply system 52 is removed to the outside of the system, and it is possible to prevent draining from occurring during stoppage.

In addition, even if in the worst case draining should occur during stoppage in the cooling steam supply system 51 and the steam supply system 52 of the steam cooling system 50A, when the gas turbine is actuated, the drainage will be moved outside the system.

However, during a normal stoppage of the gas turbine, since the pressure of the compressor discharge air falls in a rather short time, there is the concern that not all residual steam can be completely purged with the air volume after stoppage.

In consideration of this, there are operation means that implement purging by switching from cooling steam to compressor discharged air before the gas turbine stoppage, but generally in these switching cooling air systems, because there are cutoff valves, piping, etc., there is naturally pressure loss, and in places in the high temperature parts are applied, the air pressure in the cooling passage is possibly lower than the combustion gas pressure in the working passage.

It is preferable that while the gas turbine is in operation the internal pressure of the cooling passage of the gas turbine high temperature parts be always maintained at a high pressure over the pressure of the combustion gas in the working passage. In the case that in the actual part there is even a small pinhole, the combustion gas will flow back through this hole, and it is possible that local heating and scorching of the connected pipes, not only the cooling passage, will be caused.

One example is explained with FIG. 3. The steam cooling structure in the combustor 1 of the gas turbine 1 generally a cylindrical thin plate structure forming the contours of the combustor, and on the inside, a plurality of steam passages are disposed. On the outside of the cylinder there is the emitted air from the compressor 2, and on the inside is a high temperature gas combusted by slightly decompressing the emitted air (lowered only by the pressure loss incurred while the air transits the air intake of the combustor).

Now, while the gas turbine 3 is in operation, this combustor cooling steam is maintained at a pressure higher than the combustion gas, and before the gas turbine 3 is stopped, this steam is switched to the emitted air of the compressor 2. Thereby, the initial pressure $P_1$ gradually decreases in the process of the emitted air of the compressor 2 transiting the stop valves and pipes disposed in the switching system 4 introduced into the steam cooling system, and in the cooling passages, falls to a final $P_2$. In contrast, the internal pressure of the combustor 1 is $P_3$, and because there is a slight difference between $P_1$ and $P_3$, the state in which $P_3 > P_1$ can easily occur.

At this time, if there is a small pinhole in the thin plate structure of the combustor 1, the high temperature combustion gas inside will leak to the cooling passages via this hole, and not only will the thin plate structure in the combustor 1 be damaged, but finally the combustion gas arrives at the pipes connecting this cooling system, and the extent of the damage widens considerably.

Therefore, while the notion of using the emitted air of the compressor 2 to purge the steam during a gas turbine stoppage seems promising at first sight, there is the problem produced by this danger.

In order to solve the above-described problem, it is an object of the present invention to provide a means which, when a gas turbine is stopped, just before the stoppage, steam sufficiently pressurized for cooling is used, and immediately after the stoppage, most of it is self-expelled under its own pressure, and the residual part can be more simply, reliably, and safely purged.

SUMMARY OF THE INVENTION

In order to solve the above problems, the present invention provides a combined cycle power plant that is structured so as to combine a gas turbine plant and a steam turbine plant, comprises an exhaust heat recovery boiler for generating steam driving steam turbine by using the exhaust heat from the gas turbine, and a steam cooling system for cooling by steam the high temperature cooled part of this gas turbine and the superheated steam from this steam cooling system is recovered in a steam turbine, wherein a combined cycle power plant provides a means that closes the steam entrance of this steam cooling system immediately after the stoppage of the gas turbine, a means for discharging the residual steam to the atmosphere, and a means for supplying dry air, and the important parts of the steam cooling system necessary for purging the residual steam by the means for closing the steam entrance of the steam cooling system are partitioned into sections, the passage for purging the residual steam by the means that discharges the residual steam to the atmosphere is secured, and by supplying dry air to the element parts of this partitioned steam cooling system, the purging of the residual object gas is completed.

In addition, the present invention provides a combined cycle power plant comprising an air reservoir in which the dry air supply means stores a part of the compressor emitted air during operation and a means for eliminating moisture before storage, and by supplying a part of the compressor emitted air stored during operation in the air reservoir after eliminating moisture to the element, parts of the steam cooling system as dry air, the purging of the residual air is completed.

Furthermore, the present invention provides a combined cycle power generating plant that combines a gas turbine plant and a steam turbine plant, and provides an exhaust heat recovery boiler that generates steam to drive the steam turbine by using the exhaust heat from the gas turbine, and at the same time provides a steam cooling system that cools with steam the high temperature cooled parts of the gas turbine, and the superheated steam from this steam cooling system is recovered in a stream turbine, further providing a combined cycle power plant providing a means for closing the steam entrance of the steam cooling system immediately before the gas turbine stoppage, a means for discharging residual steam to the atmosphere, and a means for supplying $N_2$ gas, and wherein the purging of the residual steam using the $N_2$ gas can be carried out simply, reliably, and completely.

BRIEF DESCRIPTION OF THE DRAWINGS

FIG. 2 is a schematic drawing explaining the purging to the outside of the system of the residual steam in conventional technology.

FIG. 3 is an explanatory drawing showing an outline of a combustor is the conventional technology.

DETAILED DESCRIPTION OF THE INVENTION

Figure 1:
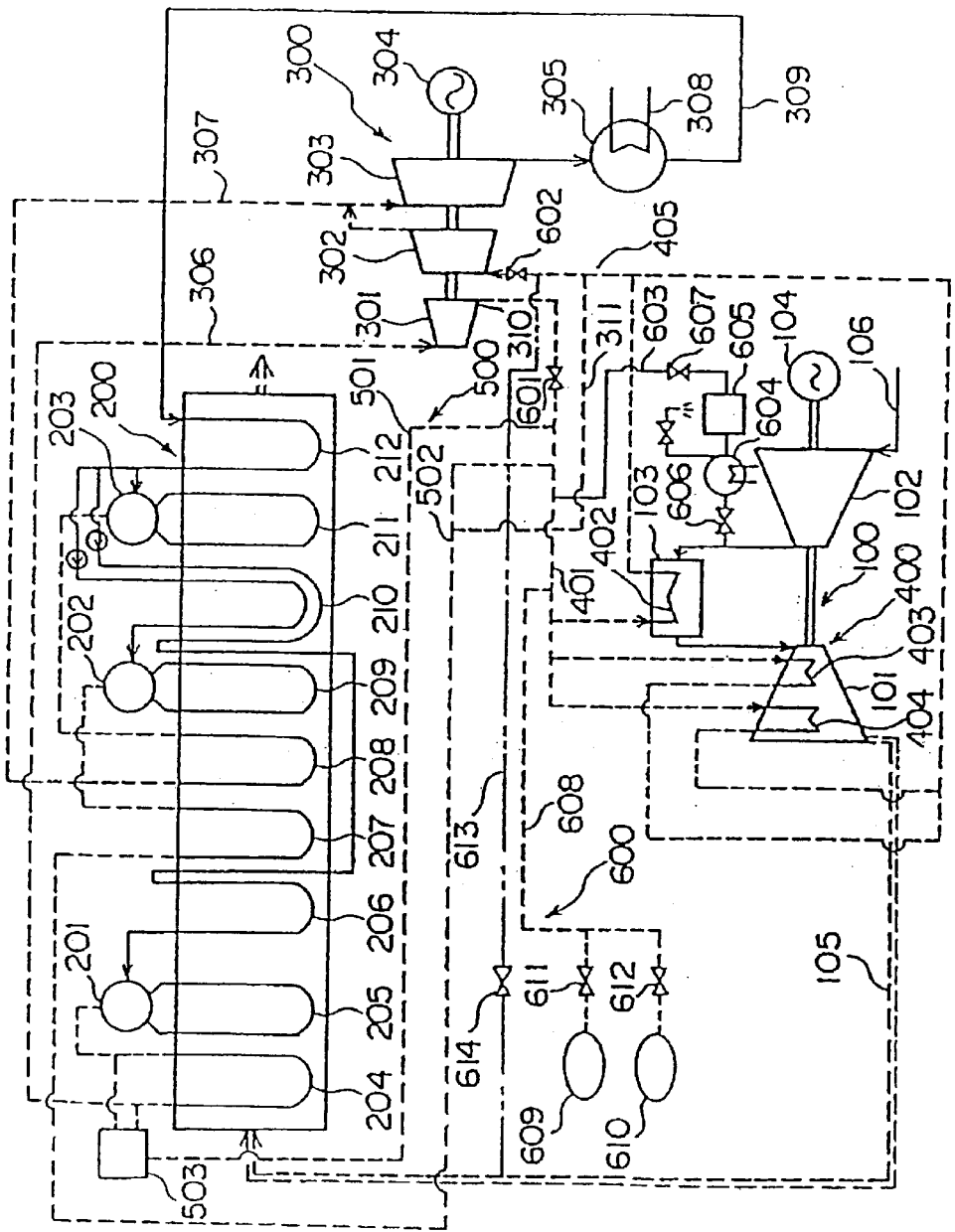
FIG. 1 is a system drawing of the combined cycle power plant according to the embodiment of the present invention.

The embodiment of the present invention is explained based on FIG. 1.

Reference numeral 101 is a gas turbine, and 102 is an air compressor that is driven by the gas turbine 101, 103 is a combustor that combusts the compressed air supplied from the air compressor 102 with fuel, and drives the gas turbine 101. Reference numeral 104 is a generator and is driven along with the air compressor. The gas turbine plant 100 comprises this gas turbine 101, air compressor 102, combustor 103, and generator 104.

The discharged gas form the gas turbine 101 is guided to the exhaust heat recovery boiler 200 via an exhaust duct 105. This exhaust heat recovery boiler 200 comprises a high pressure superheater 204, a high pressure evaporator 205, a high pressure economizer 206, a intermediate pressure superheater 207, a low pressure superheater 208, a intermediate pressure evaporator 209, a high pressure economizer 210, a low pressure evaporator 211, a low pressure economizer 212, and furthermore, a high pressure drum 201, a intermediate pressure drum 202, and a low pressure drum 203 are respectively connected to the high pressure evaporator 205, the intermediate pressure evaporator 209, and the low pressure streamer 211, and steam at each of the high pressure, intermediate pressure, and low pressure is generated using the discharged gas as the heat source.

Reference number 301 is a high pressure turbine, 302 a intermediate pressure turbine, and 303 a low pressure turbine, and the high pressure turbine 301 is driven by high pressure steam supplied via the high pressure steam line 306 from the high pressure superheater 204 of the exhaust heat recovery boiler 200, and in addition, the low pressure turbine 303 is driven by steam which is a mixture of the low pressure steam supplied via the low pressure steam line 307 from the low pressure superheater 208 of the same exhaust heat recovery boiler 200 and the discharged steam of the intermediate pressure turbine 302 described below.

In contrast, the intermediate pressure turbine 302 depends not only on the intermediate pressure steam supplied via the intermediate pressure steam line 311 from the same exhaust heat recovery boiler 200, but is driven by steam that cools the high temperature cooled part in the steam cooling system 400 described below and has as a principal part the high pressure discharged gas of the high pressure turbine supplied from the steam recovery system 405.

In addition, the steam turbine plant 300 is structured directly linking together the high pressure turbine 301, the intermediate pressure turbine 302, and the low pressure turbine 303 with the generator 304 on an axle, and including the condenser 305 connected to the low pressure turbine 303.

Reference numeral 401 is a cooling steam supply system that is structured so as to connect to the discharging part 310 of the high pressure turbine 301, and receive the discharged gas from the high pressure turbine 301.

Reference numeral 402 is the first steam cooling system, and branches from the cooling steam supply system 401 to cool the combustor 103, and in addition, reference number 403 is a second steam cooling system, 404 is a third steam cooling system, and like the first steam coiling system 402, branch from the cooling steam supply system 401 to cool the high temperature cooled part of the gas turbine 101.

In addition, a steam cooling system 400 is formed by the first, second, and third steam cooling systems 402, 403, and 404, that branch in parallel, and respectively after cooling the high temperature cooled part by using the high pressure discharged gas supplied to each of them as a cooling medium, converge again together with the same cooling medium, and via the steam recovery system 405, are supplied to the intermediate pressure turbine 302.

Reference numeral 501 is a first back up steam cooling system, and can supply the high pressure steam of the high pressure drum 201 to the cooling steam supply system 401 via the superheat reduction device 503. In addition, reference numeral 502 is a second back up steam cooling system, and can supply intermediate pressure steam of the intermediate pressure drum 202 to the cooling steam supply system 401.

Although omitted from the figures, this cooling steam supply system 401, and first back up steam cooling system 501, and the second back up steam cooling system 502 have respectively disposed control valves that link them together and that they control, and when the cooling steam supply system 401 stops the supply of high pressure discharged gas from the high pressure turbine 301, at least one among the first back up steam cooling system 501 and the second back up steam cooling system 502 supply high pressure steam or intermediate pressure steam to the cooling steam supply system 401.

That is, the back up system 500 of the steam cooling system 400 is formed by the first back up steam cooling system 501 and the second back up steam cooling system 502.

Reference numeral 600 is a steam purging system, and includes the supply steam stop valve 601 mounted on the cooling steam supply system 401 and the recovery steam stop valve 602 mounted on the steam recovery system 405, and has a first dry air supply line 603 mounted between the emission side of the air compressor 102 and the cooling steam supply system 401.

This first dry air supply line 603 includes a moisture separator 604 and an air reservoir 605, controls the control valves 606 and 607 mounted around it, supplies compressed air from the air compressor 102 to the moisture separator 604 during normal operation, and after eliminating moisture by said moisture separator 604, saves the compressed air in the air reservoir 605, and provides an amount of emission air to supplement any amount lacking in the air compressor 102.

The steam purging system 600 further includes a second dry air supply line 608, and the source of this second dry air supply line 608 is connected with the general control air supply 609 located in the plant body omitted from the drawings and the $N_2$ gas supply source 610, and depending on necessity, selectively operates the control valves 611 and 612 mounted respectively on these systems, and can supply dry air or $N_2$ to the cooling steam supply system 401.

Reference numeral 613 is a drain exhaust system, and is formed by an exhaust stop valve 614 that can be connected to the outside of the system via the exhaust heat recovery boiler 200.

Moreover, and first and second dry air supply lines 603 and 608 respectively independently function the systems of the control air source 609 and the $N_2$ gas supply source 610, and thus, of course as shown in the figure, it is not necessary to provided them side by side, and depending on the conditions of the plant, of course this can be selectively extracted and applied depending on convenience.

Moreover, in the figure, reference numeral 106 is the air supply system to the air compressor 102, 308 is the cooling water supply system of the condenser 305, and 309 is the feed water system that supplies condensate obtained with the condenser 305 to the exhaust heat recovery boiler 200.

Because this embodiment is structured in this manner, when the gas turbine 101 is stopped, immediately before the stoppage, the supply steam stop valve 601 and the recovery steam stop valve 602 are closed, and supply of high pressure discharged gas from the high pressure turbine 301 and the recovery of cooling steam via the steam recovery system 405 are cut off, and in response to this, the exhaust stop valve 614 is opened, and the residual high pressure steam in the first steam cooling system 402 that cools the combustor 103 and the second and third steam cooling systems 403 and 404 that cool the high temperature cooled part of the gas turbine 101 is discharged to the outside of the system by its own pressure via the drain exhaust system 613.

In addition, at the same time as this operation, by selectively operating the first and second dry air supply lines 603 and 608 by operating any of the control valves 607, 611, or 612, the dry air stored in the air reservoir 605, the dry air of the control air source 609, or the $N_2$ of the $N_2$ gas supply source 610 are supplied to the cooling steam supply system 401.

By these operations, the residual steam at air pressure level remaining in the high temperature cooled part of the combustor 103 and the gas turbine 101 is purged to the outside of the system by the dry air stored in the air reservoir 610 bled from the air compressor 102, the dry air from the control air source 609, or the $N_2$ gas from the $N_2$ gas supply source 610.

In this manner, according to the present invention, when the gas turbine is stopped, it is possible to purge the residual steam in the high temperature cooled part to the outside of the system very simply and reliably.

Above, the present invention was explained based on the embodiment based on the figures, but this invention is not limited to this embodiment, and within the range of this invention, it is possible to add various variations to the concrete structure.

According to the above invention, when a gas turbine is stopped, it is possible to purge reliably the residual steam in the high temperature cooled part to the outside of the system by dry air, and prevent the occurrence of unknown trouble.

In addition, according to a second aspect of the invention, dry air is ensured during normal operation, and the stability and reliability of the system could be obtained. In addition, if this dry air and the control air normally provided in the generator, etc., and a pressurized ship service air source are used, the facilities can be used advantageously.

Furthermore, according to a third aspect of the invention, because $N_2$ gas maintained in the plant body is used, and it is possible to purge out of the system the residual steam in the high temperature cooled part by switching to dry air, it is economical. Furthermore, because the $N_2$ gas itself is dry, it can be used effectively to dry the inside the plant, not just to purge residual steam out of the system. In addition, a generating plant using fuel gas has an $N_2$ gas facility for exchanging residual gas while detecting, and if this is used, the facilities can be used advantageously.

What is claimed is:

1. A combined cycle power plant, which is structured so as to combine a gas turbine plant and a steam turbine plant, said combined cycle power plant comprising:

an exhaust heat recovery boiler for generating a first steam which drives a steam turbine, of said steam turbine plant, by using an exhaust heat from a gas turbine, of said gas turbine plant;

a steam cooling system for cooling a high temperature cooled part of said gas turbine, of said gas turbine plant, by a second steam and for recovering a superheated steam from said steam cooling system in said steam turbine, of said steam turbine plant;

means for closing a steam entrance of said steam cooling system immediately after a stoppage of said gas turbine, of said gas turbine plant;

means for discharging a residual steam to an atmosphere;

means for supplying low humidity air;

an air reservoir in which said air supplying means stores a part of a compressor emitted air during operation, said compressor emitted air being different from and independent of a gas turbine compressor air; and means for eliminating moisture from said compressor emitted air before storage.

2. A combined cycle power plant that is structured so as to combine a gas turbine plant and a steam turbine plant, provide an exhaust heat recovery boiler that generates a first steam which drives a steam turbine, of said steam turbine plant, by using an exhaust heat from a gas turbine, of said gas turbine plant, and simultaneously provide a steam cooling system that cools a high temperature cooled part of said gas turbine, of said gas turbine plant, by a second steam and a superheated steam from said steam cooling system is recovered in said steam turbine, of said steam turbine plant, said combined cycle power plant comprising:

means for closing a steam entrance of said steam cooling system immediately after a stoppage of said gas turbine, of said gas turbine plant;

means for discharging a residual steam to an atmosphere;

means for supplying $N_2$ gas;

an air reservoir in which said $N_2$ supplying means stores a part of a compressor emitted air during operation, said compressor emitted air being different from and independent of a gas turbine compressor air; and means for eliminating moisture from said compressor emitted air before storage.

3. A combined cycle power plant, which is configured so as to combine a gas turbine plant and a steam turbine plant, said combined cycle power plant comprising:

an exhaust heat recovery boiler configured to generate a first steam to drive a steam turbine, of said steam turbine plant, by using an exhaust heat from a gas turbine, of said gas turbine plant;

a steam cooling system configured to cool a high temperature cooled part of said gas turbine, of said gas turbine plant, by a second steam and to recover a superheated steam from said steam cooling system in said steam turbine, of said steam turbine plant;

a closing mechanism configured to close a steam entrance of said steam cooling system immediately after a stoppage of said gas turbine, of said gas turbine plant;

a discharging mechanism configured to discharge a residual steam to an atmosphere; and a supply mechanism configured to supply low humidity air;

an air reservoir in which said supply mechanism stores a part of a compressor emitted air during operation, said compressor emitted air being different from and independent of a gas turbine compressor air; and a moisture eliminating mechanism configured to eliminate moisture from said compressor emitted air before storage.

4. A combined cycle power plant configured so as to combine a gas turbine plant and a steam turbine plant, provide an exhaust heat recovery boiler configured to generate a first steam which drives a steam turbine, of said steam turbine plant, by using an exhaust heat from a gas turbine, of said gas turbine plant, and simultaneously provide a steam cooling system configured to cool a high temperature cooled part of said gas turbine, of said gas turbine plant, by a second steam and a superheated steam from said steam cooling system is recovered in said steam turbine, of said steam turbine plant, said combined cycle power plant comprising:

a closing mechanism configured to close a steam entrance of said steam cooling system immediately after a stoppage of said gas turbine, of said gas turbine plant;

a discharging mechanism configured to discharge a residual steam to an atmosphere;

a supply mechanism configured to supply $N_2$ gas;

an air reservoir in which said supply mechanism stores a part of a compressor emitted air during operation, said compressor emitted air being different from and independent of a gas turbine compressor air; and a moisture eliminating mechanism configured to eliminate moisture from said compressor emitted air before storage.

* * * * *